United States Patent
Gonsior

(10) Patent No.: US 6,640,823 B2
(45) Date of Patent: Nov. 4, 2003

(54) FITTING

(75) Inventor: Wolfgang Gonsior, Bodolz (DE)

(73) Assignee: Xomox International GmbH & Co., Lindau/Bodensee (DE)

( * ) Notice: Subject to any disclaimer, the term of this patent is extended or adjusted under 35 U.S.C. 154(b) by 0 days.

(21) Appl. No.: 09/938,835

(22) Filed: Aug. 27, 2001

(65) Prior Publication Data

US 2002/0046768 A1 Apr. 25, 2002

Related U.S. Application Data

(63) Continuation of application No. PCT/EP00/01137, filed on Feb. 11, 2000.

(30) Foreign Application Priority Data

Feb. 25, 1999 (DE) .......................... 299 03 320

(51) Int. Cl.[7] .................. F16K 41/00; F16K 41/04; F16K 41/12
(52) U.S. Cl. .............. 137/15.18; 137/15.24; 137/315.26; 251/214; 251/309; 251/312; 251/335.2; 277/315; 277/396; 277/399; 277/511; 277/520; 277/529; 277/532
(58) Field of Search .............. 251/214, 309, 251/335.2, 312; 277/377, 396, 399, 520, 529, 532, 312, 370, 511; 137/15.18, 15.24, 315.25, 315.26

(56) References Cited

U.S. PATENT DOCUMENTS

| | | | | |
|---|---|---|---|---|
| 3,235,272 A | * | 2/1966 | Smith | 251/214 |
| 3,371,676 A | * | 3/1968 | Mullaney, III | 251/214 |
| 3,472,485 A | * | 10/1969 | Smith | 251/214 |
| 3,540,740 A | * | 11/1970 | Smith | 251/214 |
| 3,703,910 A | * | 11/1972 | Smith | 251/214 |
| 3,930,635 A | * | 1/1976 | Smith | 251/214 |
| 4,101,113 A | | 7/1978 | Plessing | 251/214 |
| 4,333,632 A | * | 6/1982 | Smith | 251/214 |
| 4,410,003 A | * | 10/1983 | Sandling | 137/312 |
| 4,462,568 A | | 7/1984 | Taylor et al. | 251/214 |
| 4,475,712 A | * | 10/1984 | DeJager | 251/214 |
| 4,475,713 A | * | 10/1984 | Reed et al. | 251/214 |

(List continued on next page.)

FOREIGN PATENT DOCUMENTS

| | | |
|---|---|---|
| DE | 2250168 | 4/1974 |
| EP | 0353521 | 6/1990 |

OTHER PUBLICATIONS

Copy of the Search Report.

*Primary Examiner*—George L. Walton
(74) *Attorney, Agent, or Firm*—Crowell & Moring LLP

(57) ABSTRACT

A fitting including a housing (2), a rotatable body (4) which is situated in the housing and which may advantageously be constructed in the form of a conical plug, a bushing (18) provided in the housing to floatingly mount and seal the rotatable body (4), a cover (14) connected to the housing (2), a shaft (12) coupled with the rotatable body (4) and extended out through the cover (14), and at least one sealing element (30, 44) associated with the shaft (12). The fitting is configured in such a way that the bushing (18), the at least one sealing element (30, 44), and the cover (14) can be positioned and mounted centrally and free from transverse forces in relation to the axis (10) of the floatingly mounted rotatable body (4). To this end, the shaft (12) and the rotatable body (4) are constructed as one piece, the cover (14) is attached to the housing (2) with a non-positive fit so that the position of the cover can be adjusted and it can be centered in relation to the axis of rotation (10) of the rotatable body (4), and the cover (14) contains a centering body (34) which is associated with the sealing element (30, 44) and can be radially aligned with the shaft (12).

11 Claims, 4 Drawing Sheets

U.S. PATENT DOCUMENTS

| | | | |
|---|---|---|---|
| 4,531,537 A | * 7/1985 | Smith | 251/214 |
| 4,610,266 A | * 9/1986 | Sandling | 251/214 |
| 4,886,241 A | * 12/1989 | Davis et al. | 251/214 |
| 4,930,748 A | 6/1990 | Gonsior | 251/214 |
| 4,972,867 A | * 11/1990 | Ruesch | 251/214 |
| 5,234,194 A | * 8/1993 | Smith | 251/214 |
| 5,263,682 A | * 11/1993 | Covert et al. | 251/214 |
| 5,326,074 A | * 7/1994 | Spock, Jr. et al. | 251/214 |
| 5,372,352 A | * 12/1994 | Smith et al. | 251/214 |
| 5,402,983 A | * 4/1995 | Bernhardt | 251/309 |

* cited by examiner

FITTING

CROSS REFERENCE TO RELATED APPLICATIONS

This application is a continuation of International Patent Application No. PCT/EP00/01137, filed Feb. 11, 2000, designating the United States of America, the entire disclosure of which is incorporated herein by reference. Priority is claimed based on Federal Republic of Germany Patent Application No. DE 299 03 320.1, filed Feb. 25, 1999.

BACKGROUND OF THE INVENTION

The invention relates to a method for producing or assembling a fitting, such as a valve or stopcock.

U.S. Pat. No. 4,101,113 discloses a fitting with a rotating body in the form of a conical plug inside a housing, which can be produced according to such a method. A shaft that is guided to the outside through a cover connected to the housing of the fitting, which is configured as a valve, is integrally connected to the rotating body to form a single piece. The housing comprises a contact surface for an annular surface of the cover. Said contact surface is surrounded radially on the outside by an annular collar by means of which the cover is centered in relation to the housing. An annular gap is provided between the outer surface of the shaft and an inner surface of the cover surrounding the shaft in which a sealing element is arranged which fits tightly against the inner surface of the cover on the one hand and the outer surface of the shaft on the other. The sealing element is axially clamped between two thrust rings. The one thrust ring contacts the outer surface of the shaft and the other thrust ring the inner surface of the cover. Pressure is applied to the sealing element by means of a locating ring, which partially engages with said annular gap, and an axial end face of the rotating body is supported via a support ring, which is also arranged in the annular gap. Further, a secondary sealing element is provided in the form of a membrane or packing disk, which is clamped radially on the outside between the housing and the cover and is fixed radially on the inside between the support ring and said axial end face of the rotating body. The support ring is centered in relation to the shaft by means of two centering rings and is provided with an outwardly facing annular shoulder. A relatively large distance to the inner surface of the cover is specified. Precise centering of the cover in relation to the shaft is not provided. The housing comprises a comparatively soft bushing made of plastic, particularly polytetrafluoroethylene (PTFE), which serves to float-mount the rotating body and to prevent metallic contact between the rotating body and the housing. The rotating body contains a passage opening in such a way that the passage can at least partially be unblocked or blocked depending on the momentary rotary position around the axis of rotation of the rotating body. Since said bushing compensates tolerances of the inside dimensions of the housing, the axis of rotation does not usually coincide with the housing axis in such a float-mounted rotating body or plug.

Further, U.S. Pat. No. 4,462,458 discloses a fitting with a float-mounted rotating body in the form of a conical plug, which is integrally connected to a shaft to form a single piece. A sealing element, which tightly fits against the outer surface of the shaft, is clamped between the cover and the housing. The housing comprises a contact surface associated with the cover, which is provided radially outside of an annular collar to center the cover in relation to the housing. The axial position of the rotating body within the housing is secured by the cover and a thrust ring. Further, sealing forces are transmitted to a secondary sealing element, e.g., a metal or molded membrane. The cover partially rests on the sealing element and is centered within the housing by means of said annular collar. The sealing element is under direct load, and the radial alignment of the sealing element in relation to the shaft is essentially determined by the position of the cover and a centering ring arranged within the cover. Due particularly to the bushing, which is made of a comparatively soft material, and manufacturing tolerances, it has to be assumed that the axes of the housing, the rotating body and the cover do not coincide.

To rotate the rotating body, such fittings are often equipped with drives, which are typically mounted to said cover by means of brackets and are centered especially on a centering collar of the cover. Due to the offset of the axes between the rotating body and the cover and/or said bracket or the drive, lateral forces may result, which act on the rotating body and lead to leakage as well as premature wear of said bushing and/or secondary sealing element. Furthermore, due to the form-fit and positive, interlocking connection between the cover, the secondary sealing element and the housing, it cannot be excluded that the driving forces to be transmitted have a negative effect on the sealing forces of the secondary sealing element, or that the sealing forces cancel each other out at least partially, with the consequence of unacceptable external leakage.

U.S. Pat. No. 4,930,748 (=EP 353,521) discloses a fitting of this type embodied as a stopcock, the rotating body and shaft of which are made as two parts and are suitably coupled to transmit a rotary motion. This two-part configuration of shaft and rotating body makes it possible to compensate a design or manufacturing-related offset of the axes of the rotating body, the housing, the cover and the shaft. But this involves additional, not insignificant manufacturing and assembly costs.

SUMMARY OF THE INVENTION

Accordingly, it is an object of the invention to provide a method for producing a fitting that is simple to execute and that obviates the aforementioned drawbacks.

It is also an object of the invention to provide a method of assembling a fitting in which various secondary parts, especially the bushing, the secondary sealing element, the cover and optionally a drive to rotate the rotating body, are arranged in a functionally reliable manner in such a way that they are mounted centered or coaxially and are free from transverse or lateral forces with respect to the axis of rotation of the float-mounted rotating body.

These and other objects of the invention are achieved by the method described and claimed hereinafter.

The proposed method, despite a simple yet functional design, ensures the centered or coaxial arrangement of the different secondary parts in relation to the axis of rotation of the float-mounted rotating body, so that lateral forces on the secondary parts are avoided. During production or assembly of the fitting, the cover with its flat annular surface is first positioned directly against the likewise flat contact surface of the housing. No centering means for the cover in relation to the housing are provided. The cover is then centered in relation to the shaft and thus the axis of rotation of the rotating body by means of a mounting sleeve, the inner surface of which fits against the outer surface of the shaft without play and which comprises centering means that correspond to the cover, or by means of a centering ring, which is arranged within the cover and fits against the outer surface of the shaft. Since the shaft and the rotating body form a single piece, the cover is coaxially aligned in relation to the axis of rotation of the rotating body, irrespective of the position of the axis of rotation in relation to the housing axis. A drive of the rotating body that can be connected to the cover is thus also centered in relation to the axis of rotation and undesirable lateral forces are thereby avoided. The sealing element, which contacts the shaft and furthermore is arranged between the cover and the housing, preferably does not lie under direct load, which results in an exclusively nonpositive connection between the cover and the housing. When the fitting is assembled, the sealing element contacting the shaft is centered, so that spot-type wear and/or irregular wear over the circumference of the sealing element is avoided and a long service life and functionally reliable seal is ensured.

In one advantageous embodiment, the thrust ring, which is arranged in a recess of the cover, is used as a centering body, wherein an elastic element and/or an additional sealing ring, particularly in the form of an O-ring, ensures radial support of the centering body within said recess in the cover. Between the centering body and the cover, preferably along a cylindrical inside wall thereof, there is an annular gap, so that the centering body does not directly contact the cover. Instead, the annular gap is bridged by means of said elastic element and/or sealing ring and the centering body is indirectly supported inside the cover. The centering body comprises a supporting surface in such a way that the secondary sealing element is supported at least in radial direction. The centering body is configured in the form of a ring and serves as a thrust ring for the rotating body so that the latter is pushed in axial direction into the bushing of the housing at a predefined axial bias or prestressing force. The ring, which is simultaneously configured as a thrust ring and acts as a centering body, thus performs a dual function and while requiring a minimum amount of material and space ensures that on the one hand the float-mounted rotating body is axially pressed into the bushing and on the other hand the secondary sealing element is centered.

The fitting, through the housing of which a flow medium can flow, can be configured especially in the form of a stopcock, a selector valve or a control valve with a rotating body configured especially as a plug or a ball, or in the form of a butterfly valve or control flap whose rotating body is configured as a valve disk which is float-mounted within the housing. The rotating body is used to control, particularly block, throttle or regulate the flow of the flow medium. No special mounting of the shaft within the cover is necessary and the production and assembly costs are reduced. The connection between the cover and the housing is such that advantageously none of the sealing parts lie directly under load. For assembly, this allows free radial mobility and alignment of the cover and especially of the sealing elements in relation to the rotating body, and the cover is advantageously metallically supported on the associated contact surface of the housing. None of the sealing parts, particularly the primary and secondary seals, lie under direct load and the driving forces have no influence on them. During assembly, the cover is centered by means of the shaft, which is extended through the bore in the cover, by using a mounting sleeve or a centering ring that is provided in the cover, so that the shaft axis precisely coincides with the axis of rotation of the rotating body or with the plug axis. Direct loading is effected via the cover, which is fixedly connected to the housing.

Neither the cover nor the housing contains any centering means that correspond with one another, such as annular shoulders, centering surfaces, grooves or the like. The cover is flat along the contact surface, or the corresponding contact surface of the housing, so that a centered alignment of the axis of rotation or the plug axis may be readily performed even if the axis of rotation of the shutoff device is not precisely aligned with the housing axis. Said housing axis is defined by the geometry of the seat for the shutoff device in the housing. The shutoff device is supported in said bushing, which is made of a material that is soft compared to the material of the housing, and forms the axis of rotation or the plug axis, which need not coincide with said housing axis as a function of design or production. The secondary parts, particularly the cover and the secondary seals, delta ring, molded and steel membranes as well packing gland parts associated with the plug shaft are advantageously centered by means of the plug shaft. The cover as well as said molded and steel membranes can advantageously be radially shifted on associated contact surfaces of the housing for the purpose of coaxial alignment in relation to the axis of rotation or the plug axis with respect to which the shaft axis is precisely coaxial or identical. Preferably, the sealing parts do not lie under direct load.

Additional preferred embodiments of the invention are described in the following detailed description.

BRIEF DESCRIPTION OF THE DRAWINGS

The invention will now be described in further detail with reference to illustrative preferred embodiments shown in the accompanying drawings in which.

DETAILED DESCRIPTION OF PREFERRED EMBODIMENTS

Figure 1:
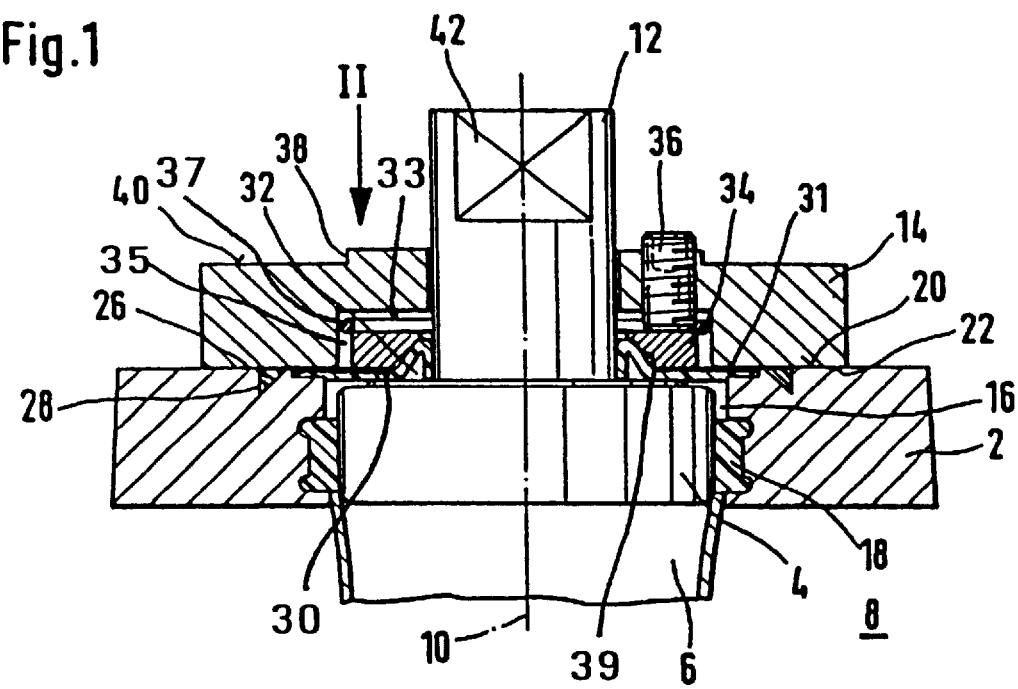
FIG. 1 is a partial section through the fitting, which is constructed as a stopcock, in an axial section plane.

FIG. 1 partially shows housing 2 of the fitting, which is configured as a stopcock with a rotating body 4 in the form of a conical plug, which is provided with a passage opening 6. In the depicted rotary position of the rotating body 4, a flow medium can flow through passage opening 6 and interior 8 of housing 2. It should be expressly noted at this point that the fitting according to the invention may comprise a spherical rotating body, a throttle body or a valve disk instead of the plug or the rotating body and, depending on the application, can be configured as a stopcock, a selector valve, a control valve, or a ball valve, or as a flap or the like. Merely for the sake of simplicity, the rotating body 4 is hereinafter also referred to as shutoff device or plug. After the shutoff device 4 has been rotated about its axis of rotation 10 by 90°, the flow of the flow medium is blocked. A shaft 12, which is extended out of the housing 2 through a cover 14 is integrally connected with the shutoff device 4 forming a single piece. The shaft axis is identical with the axis of rotation or the plug axis 10. In the housing recess 16 provided for the shutoff device 4, a bushing 18 is arranged to support and seal the rotatable shutoff device. The bushing 18 is made particularly of PTFE or a comparable material, which is softer in comparison to housing 2, which is preferably made of metal and/or assures the float-mounting of the shutoff device 4. Metallic contact between the shutoff device, which is advantageously also made of metal, and housing 2 is prevented by means of the bushing 18. It should be noted at this point that the axis of rotation 10 of the shutoff device 4 or the plug is not necessarily aligned with the axis of the housing opening, particularly as a result of manufacturing tolerances. Due to the one-piece configuration of the shutoff device 4 and the shaft 12 in combination with the arrangement and construction especially of cover 14 and other secondary parts, which will be described in greater detail below, prevents any undesirable transverse forces.

Figure 2:
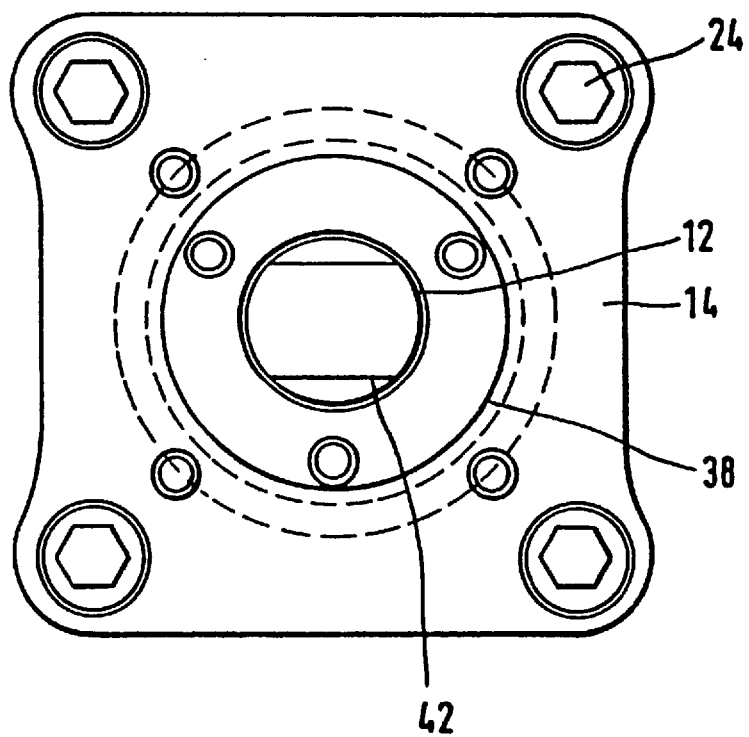
FIG. 2 is a top view of the stopcock according to FIG. 1 viewed in direction of arrow II.

The housing 2 comprises a contact surface 20 associated with cover 14 against which cover 14 rests directly with a flat annular surface 22 in a non-interlocking fit. It is essential that the cover, particularly during assembly, be freely movable in radial direction with respect to housing 2 and can be coaxially aligned to the axis of rotation 10 of the shutoff device 4. The fixed and exclusively non-interlocking connection with housing 2 of the metallic cover 14, which rests directly on the contact surface 20 of housing 2 is then effected by means of cover bolts 24 shown in FIG. 2. Advantageously, no annular shoulders, centering collars or the like are present either in housing 2 or on cover 14 for mutual alignment or centering of cover 14 and housing 2.

Further, between housing 2 and cover 14, a cover seal 26 is advantageously provided in an annular groove 28 of housing 2, which radially inwardly adjoins contact surface 20. Further, to seal shutoff device 4 and shaft 12, a first secondary sealing element 30 is provided, which is preferably formed as a molded membrane and is likewise made of PTFE. In addition, a steel membrane 31 is provided, which lies between cover 14 and molded membrane 30. This molded membrane 30, which fits with a lip against the especially cylindrical outer surface of shaft 12, can preferably be aligned radially in relation to shaft 12. This is accomplished particularly during mounting of the cover, before the aforementioned cover bolts 24 are tightened. Due to the capacity for radial alignment of the molded membrane 30 and particularly also the steel membrane 31 with respect to shaft 12 and thus with respect to the shutoff device 4, which is integrally connected therewith, an axial offset with respect to the shutoff device 4 and the otherwise resulting lateral forces and their harmful consequences are particularly advantageously avoided. The molded membrane 30 is radially inwardly supported in the area of the lip that is coaxial to the shaft 12 by means of a triangular or delta ring 32, which in turn is supported against the upper ring collar of the shutoff device 4 in the manner shown.

Further, within cover 14 in a recess 33, which is constructed as an annular space, a centering body is provided in the form of a ring 34, which rests against the inner part of the molded membrane 30 as shown at the top of the drawing. Between the inner wall of the annular space 33 and the centering body 34 there is an annular gap 35. The centering body 34 is preferably ring-shaped and simultaneously serves as a thrust ring. On the other side, at the top of the drawing, at least one adjusting element 36, particularly in the form of a bolt, is associated with the centering body and thrust ring 34 and is located within cover 14 and can be actuated from the outside. Advantageously, several such adjusting elements 36 or bolts are distributed around the circumference to permit an axial adjustment of the shutoff device 4 via thrust ring 34 as required. The centering body and/or thrust ring 34 is elastically supported in radial direction against the preferably cylindrical inside wall of cover 14 via a sealing ring 37 that is arranged within the annular gap 35. The sealing element 30, the radially outer rim of which is clamped between housing 2 and cover 14, serves as a secondary seal of the housing recess 16 relative to the exterior of the fitting. The hook-shaped sealing lip, which lies radially inside, fits against shaft 12. Apart from the radially outward clamping, the secondary sealing element 30 is not directly supported on cover 14, but against the centering body and/or thrust ring 34, at least in radial direction. As may be seen, the centering body has a support surface 39, which is sloped in relation to longitudinal axis 10 corresponding to the hook-shaped sealing lip and which, among other things, effectively supports sealing element 30 in radial direction. This indirect radial support of the sealing element 30 via centering body 34 in cover 14 ensures coaxial alignment of sealing element 30, particularly its sealing lip, which fits tightly against shaft 12, in relation to longitudinal axis 10.

The cover 14 further has a centering shoulder 38 on its side facing away from housing 2 and a contact surface 40 for a bracket (not depicted) of a drive, which is coupled to shaft 12 via at least one, particularly flat and paraxial engagement face 42.

Figure 3:
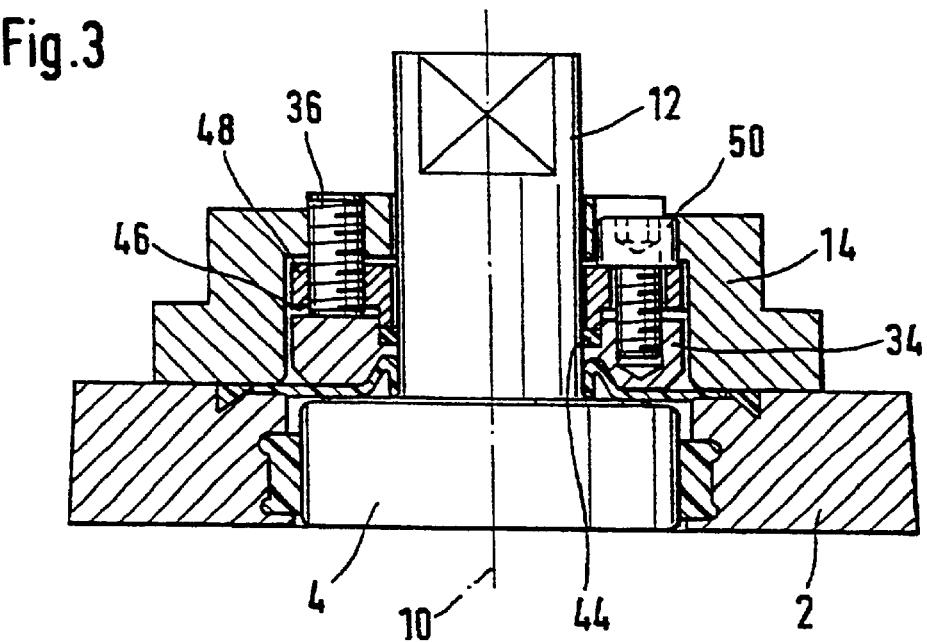
FIGS. 3 and 4 are a partial sectional view and a top view, respectively, of a second embodiment of a stopcock according to the invention having a safety packing gland.
Figure 4:
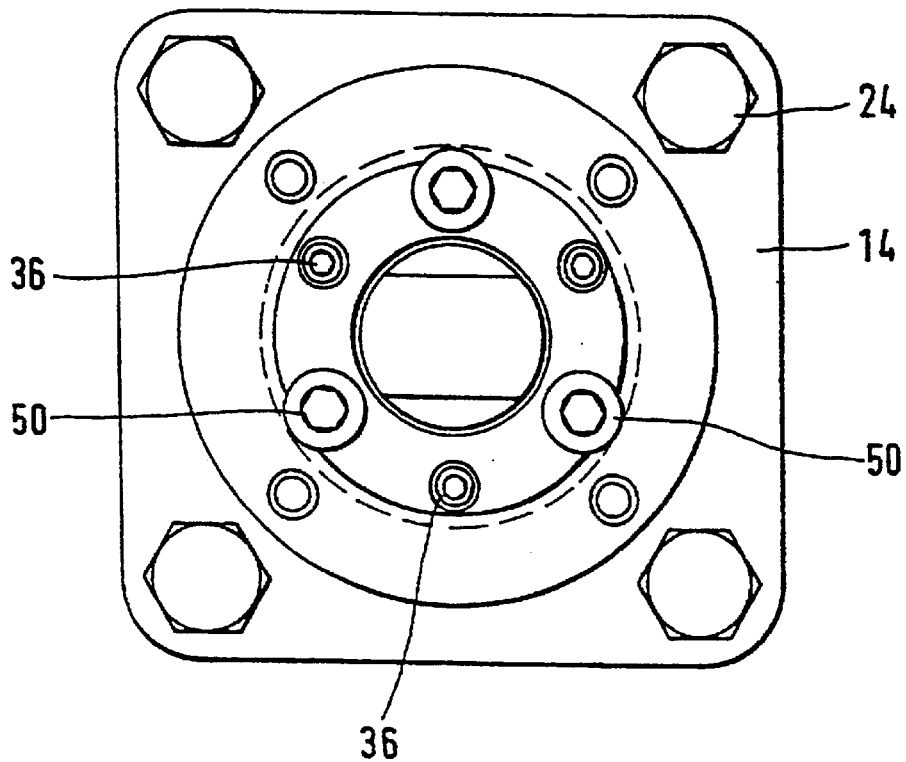

FIGS. 3 and 4 show an embodiment of the stopcock with a second secondary seal 44, which is formed as a packing gland. The second secondary seal 44 associated with shaft 12, like thrust ring 34, is arranged in an annular space 46 within cover 14, which is connected to housing 2 in an exclusively force locked fit as described above. A further thrust ring 48 is associated with the secondary seal or packing gland 44, which makes it possible to adjust or readjust the secondary seal 44. To this end, especially at least one bolt 50 is provided in cover 14. As may be seen in connection with FIG. 4, several, advantageously three adjusting bolts 50 are provided around the circumference and can be actuated from the outside, which makes it possible to adjust the shutoff device 4 and the first secondary seal, namely the molded membrane 30, as required axially via thrust ring 34 without influencing the second secondary seal 44. Thus, there are three sealing systems that provide a seal toward the outside, of which two may be adjusted independently from one another. This special embodiment is at least equivalent to a bellows-type seal with a downstream safety packing gland and thereby meets, in particular, the safety requirements of the German Emergency Regulation or the Technical Regulations AIR or the 12th Law Concerning the Protection against Harmful Effects on the Environment through Air Pollution, Noise, Vibrations, and Similar Factors [BImSchV]. The fitting according to the invention comprises bushing 18 as a primary seal between housing 2 and shutoff device 4. Adjustment is made possible via a threaded pin 36. The first secondary seal provided is the aforementioned molded membrane 30, which is also adjusted via the threaded pin 36. Finally, the second secondary seal provided is the packing gland 44, which may be adjusted by adjusting bolt 50. During assembly, prior to screwing down cover 14 by means of cover bolts 24 on housing 2, the second secondary seal 44 is also automatically centered in relation to the axis of rotation 10 of the shutoff device 4. With respect to the remaining components and the functional relationships, reference is made to the above description.

Figure 5:
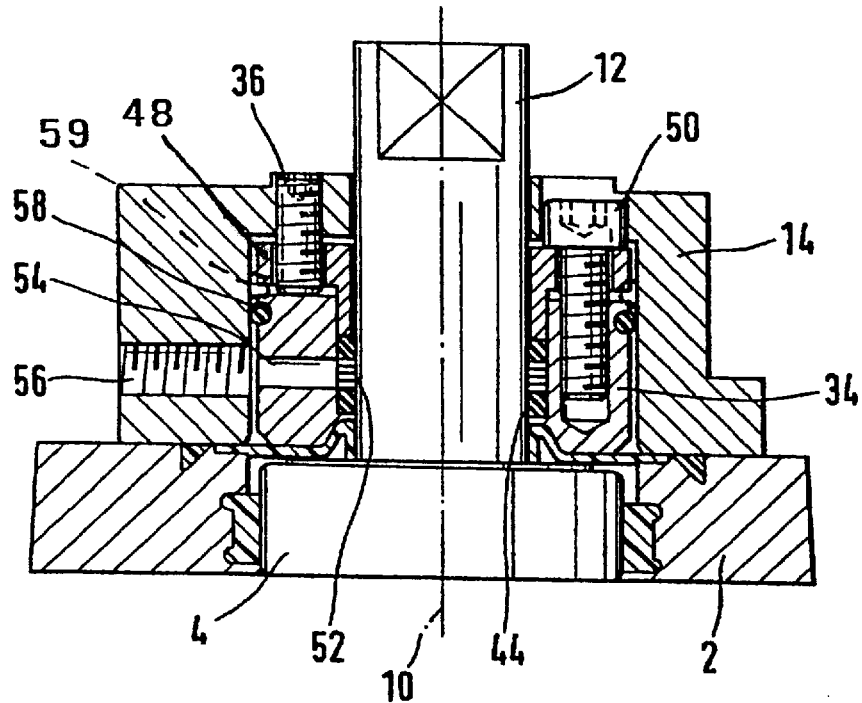
FIGS. 5 and 6 are a partial section and a top view, respectively, of a further embodiment with a safety packing gland and leakage monitoring.
Figure 6:
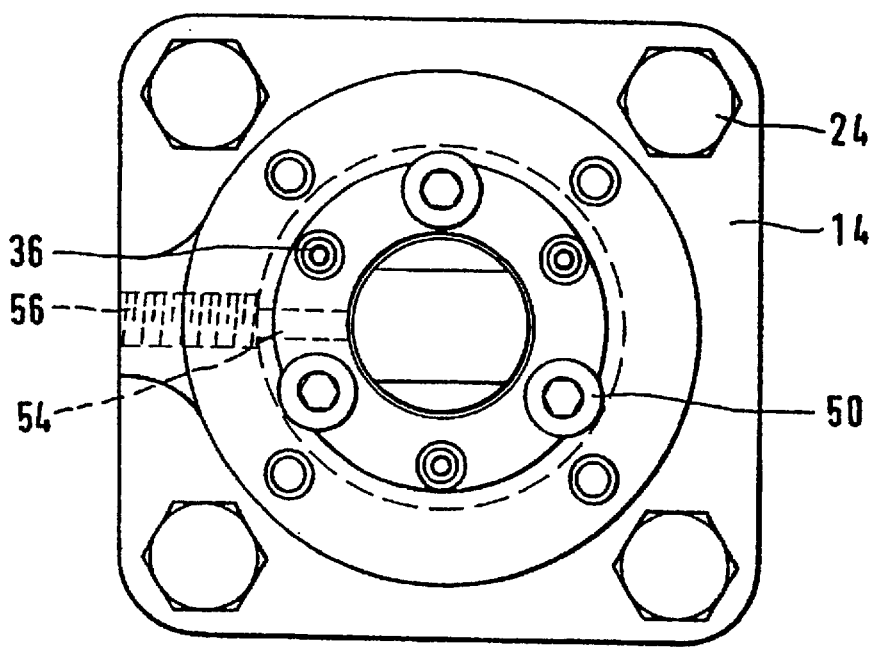

FIGS. 5 and 6 show a further embodiment, which basically corresponds to the embodiments described above, but in addition permits leak monitoring. In the area of the second secondary seal 44, which is again advantageously embodied as a packing gland, a leakage ring 52 is provided, which permits especially the radial passage of any leaks through a bore 54 in the first thrust ring 34 and supplies them to a connection port 56 for a monitoring connection. By means of sealing ring 58 between the outer surface of the thrust ring 34 and the inner surface of the cover 14, the emergence of leaks to the outside is advantageously prevented. As indicated by a dashed line 59, the aforementioned sealing ring may alternatively be arranged radially outside in the area between the centering body or first thrust ring 34 and the additional thrust ring 48. To receive sealing ring 59 in this alternative embodiment, the outside corners facing one another of the centering body or thrust ring 34 and the additional thrust ring 48 are configured according to the spherical contour of the sealing ring 59.

Figure 7:
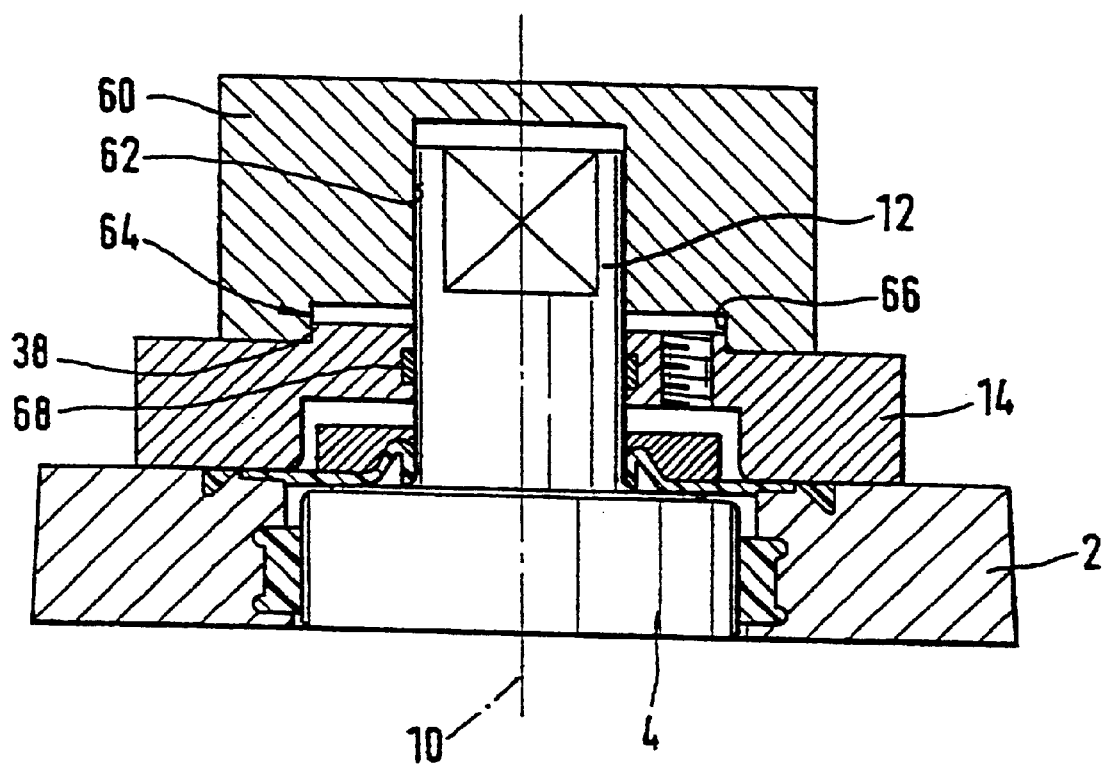
FIG. 7 is a partial section through the stopcock according to FIG. 1 during assembly.

FIG. 7 shows the stopcock during assembly. According to the invention, a mounting device is provided to center the cover 14 in relation to the axis of rotation 10 of the rotating body 4. This mounting device comprises a mounting sleeve 60 whose inner surface 62 contacts the outer surface of the shaft 12 without play. Further, centering means are provided to center or precisely coaxially align the cover 14 in relation to shaft 12 and thus the axis of rotation 10 of the rotating body 4. This centering means 64 is configured especially as an annular shoulder 66 of the mounting sleeve and as a centering collar 38 of cover 14, which corresponds to the aforementioned annular shoulder 66. The centering collar 38 thus advantageously performs a dual function. On the one hand it is provided to center cover 14 in relation to the axis of rotation 10 and on the other hand to center the aforementioned bracket of a drive. After centering of the cover 14, a fixed nonpositive connection to housing 2 is created by tightening the aforementioned cover bolts.

In an alternative embodiment, the cover 14 may comprise a centering ring 68, which fits against the outer surface of shaft 12. By means of said centering ring 68, the cover 14 is centered during assembly, namely prior to tightening the aforementioned cover bolts. It is expressly noted that after producing the fixed connection of cover 14, the centering ring 68 has no support function for shaft 12.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A method for producing a fitting which comprises a housing, a rotating body in said housing having a shaft formed as a single piece therewith by which the rotating body can be rotated about an axis of rotation, a bushing arranged in said housing to float-mount and seal the rotating body, and a cover secured to said housing by cover bolts with said shaft extending through the cover to outside said fitting, wherein the cover defines an annular space around said shaft and a thrust ring is arranged in said space forming a radial annular gap, said thrust ring being associated with a sealing element which fits against the shaft, and wherein the cover has a flat annular lower surface positioned against a flat contact surface of the housing and is centered and connected to the housing with a non-positive fit, said method comprising:

initially positioning the cover with said flat annular surface directly on the flat contact surface of the housing with no centering means being provided for the cover with respect to the housing, thereafter coaxially aligning the cover in relation to the shaft and the axis of rotation of the rotating body by way of a mounting sleeve having an inner surface which contacts the outer surface of the shaft without play and which comprises a centering element comprising an annular shoulder which engages a centering collar on the cover, and subsequently securely connecting the cover to the housing by tightening the cover bolts.

2. A method as claimed in claim 1, wherein said rotating body is constructed as a conical plug.

3. A method as claimed in claim 1, wherein the annular lower surface of the cover facing the housing is flat throughout.

4. A method as claimed in claim 1, wherein the contact surface of the housing facing the cover has an annular groove containing a cover seal against which the lower annular surface of the cover is positioned to seal the cover to the housing.

5. A method as claimed in claim 1, further comprising:

positioning a secondary seal in the form of a molded seal against the shaft to form a seal between the shaft and the cover before the cover is securely connected to the housing, centering the secondary seal via the shaft in relation to the axis of rotation of the rotating body, and subsequently fixing the secondary seal between the cover and the housing.

6. A method as claimed in claim 1, wherein the thrust ring is constructed as a centering body for the cover and is disposed with a radial annular gap between the thrust ring and the cover, and the sealing element for the shaft is positioned on the thrust ring.

7. A method as claimed in claim 6, wherein an annular elastic sealing element is arranged between the thrust ring and the cover.

8. A method as claimed in claim 1, further comprising:

arranging a second secondary sealing element within the annular space defined by the cover, and adjusting the position of said second secondary sealing element by way of an additional thrust ring also disposed in said annular space.

9. A method as claimed in claim 8, whereinsaid second secondary sealing element comprises a packing gland.

10. A method as claimed in claim 8, wherein a leakage ring is associated with said secondary sealing element, and a connection to the exterior is created through said leakage ring for monitoring leakage from said fitting.

11. A method as claimed in claim 10, wherein said connection to the exterior is created by a radial bore in the thrust ring and a connection port in the cover.

\* \* \* \* \*